US011619936B2

(12) United States Patent
Wang et al.

(10) Patent No.: US 11,619,936 B2
(45) Date of Patent: Apr. 4, 2023

(54) METHOD AND APPARATUS FOR REMOTELY CONTROLLING SELF-DRIVING VEHICLE

(71) Applicant: APOLLO INTELLIGENT DRIVING TECHNOLOGY (BEIJING) CO., LTD., Beijing (CN)

(72) Inventors: Zijie Wang, Beijing (CN); Yingnan Liu, Beijing (CN); Wenlong Rao, Beijing (CN); Jingjing Xue, Beijing (CN); Hailong Sun, Beijing (CN); Shi Hu, Beijing (CN); Yue Wang, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 498 days.

(21) Appl. No.: 16/716,365

(22) Filed: Dec. 16, 2019

(65) Prior Publication Data
US 2020/0193198 A1 Jun. 18, 2020

(30) Foreign Application Priority Data

Dec. 17, 2018 (CN) .......................... 201811543823.3

(51) Int. Cl.
G05D 1/00 (2006.01)
G06V 20/59 (2022.01)
G06V 40/16 (2022.01)

(52) U.S. Cl.
CPC ......... G05D 1/0061 (2013.01); G05D 1/0011 (2013.01); G06V 20/597 (2022.01); G06V 40/174 (2022.01); G05D 2201/0213 (2013.01)

(58) Field of Classification Search
None
See application file for complete search history.

(56) References Cited

U.S. PATENT DOCUMENTS

2018/0095457 A1* 4/2018 Lee .................... G05D 1/0061
2019/0087668 A1* 3/2019 Kim .................... G08G 1/168
2021/0221404 A1* 7/2021 Reiner ................ G05D 1/0055

FOREIGN PATENT DOCUMENTS

CN 105931269 A 9/2016
CN 107220591 A 9/2017
(Continued)

OTHER PUBLICATIONS

The Chinese First Examination Report of corresponding Chinese application No. 201811543823.3, dated Jan. 22, 2020.

Primary Examiner — Hunter B Lonsberry
Assistant Examiner — Paysun Wu
(74) Attorney, Agent, or Firm — J.C. Patents

(57) ABSTRACT

The present disclosure provides a method and an apparatus for remotely controlling a self-driving vehicle, including: a control device receives operation state information of the vehicle to be controlled transmitted by the vehicle, and video data and/or audio data of a passenger in the vehicle; determines a first abnormal parameter of the vehicle according to the operation state information of the vehicle; determines a second abnormal parameter of an emotion of the passenger in the vehicle according to the video data and/or audio data of the passenger in the vehicle; and controls the vehicle remotely according to the first abnormal parameter and the second abnormal parameter. It is possible to avoid the situation that the passenger in the vehicle performs a wrong manipulation on the vehicle due to a large emotional fluctuation in an emergency, thus making the control of the vehicle more safe and reliable in the emergency.

17 Claims, 6 Drawing Sheets

(56) References Cited

FOREIGN PATENT DOCUMENTS

| | | | |
|---|---|---|---|
| CN | 107316436 | A | 11/2017 |
| CN | 107776574 | A | 3/2018 |
| CN | 107878460 | A | 4/2018 |
| EP | 2884477 | A1 | 6/2015 |

* cited by examiner

METHOD AND APPARATUS FOR REMOTELY CONTROLLING SELF-DRIVING VEHICLE

CROSS-REFERENCE TO RELATED APPLICATIONS

This application claims priority to Chinese Patent Application No. 201811543823.3, filed on Dec. 17, 2018, which is hereby incorporated by reference in its entirety.

TECHNICAL FIELD

The present disclosure relates to the field of self-driving vehicles, and in particular, to a method and an apparatus for remotely controlling a self-driving vehicle.

BACKGROUND

A self-driving vehicle, also known as unmanned vehicle, mainly uses a collaboration of artificial intelligence, computer vision, a radar, a surveillance device, and a navigation and positioning system, which uses the computer visual technology, together with a monocular camera or a multi-camera to enable the self-driving vehicle to identify traffic lights, traffic signs, lane lines, low-speed obstacles in a short distance and the like in real time, and to communicate with road infrastructures and cloud databases to allow the vehicle to travel on planned routes in accordance with traffic rules.

During traveling, there may be an urgent scenario that the self-driving vehicle may be out of control or need to be manually operated. In prior art, the self-driving vehicle is equipped with a safety operation personnel, who performs an on-site manipulation according to the situation of the vehicle.

However, the existing technology cannot avoid the situation that the safety operation personnel may have an intense emotion or a strong mood due to an emergency of the vehicle and thus make a wrong manipulation.

SUMMARY

The present disclosure provides a method and an apparatus for remotely controlling a self-driving vehicle, which can avoid the situation that a passenger in the vehicle performs a wrong manipulation on the vehicle due to a large emotional fluctuation in an emergency.

A first aspect of the present disclosure provides a method for remotely controlling a self-driving vehicle, including:
receiving operation state information of the vehicle to be controlled transmitted by the vehicle, and video data and/or audio data of a passenger in the vehicle;
determining a first abnormal parameter of the vehicle according to the operation state information of the vehicle;
determining a second abnormal parameter of an emotion of the passenger in the vehicle according to the video data and/or audio data of the passenger in the vehicle; and
controlling the vehicle remotely according to the first abnormal parameter and the second abnormal parameter.

Optionally, the determining a second abnormal parameter of an emotion of the passenger in the vehicle according to the video data and/or audio data of the passenger in the vehicle includes:
acquiring an expression abnormal parameter and an action abnormal parameter of the passenger in the vehicle according to the video data of the passenger in the vehicle; and
determining the second abnormal parameter according to the expression abnormal parameter and the action abnormal parameter.

Optionally, the acquiring an expression abnormal parameter and an action abnormal parameter of the passenger in the vehicle according to the video data of the passenger in the vehicle includes:
acquiring an expression of the passenger in the vehicle and a level of the expression according to the video data of the passenger in the vehicle, and determining the expression abnormal parameter according to the expression of the passenger in the vehicle and the level of the expression; and
acquiring a key frame in a preset time period from the video data of the passenger in the vehicle, and determining the action abnormal parameter according to a pixel difference value between adjacent key frames in the preset time period.

Optionally, the determining a second abnormal parameter of an emotion of the passenger in the vehicle according to the video data and/or audio data of the passenger in the vehicle includes:
determining the emotion of the passenger in the vehicle and a level of the emotion according to the audio data of the passenger in the vehicle; and
determining the second abnormal parameter according to the emotion of the passenger in the vehicle and the level of the emotion.

Optionally, the controlling the vehicle remotely according to the first abnormal parameter and the second abnormal parameter includes:
performing a weighting operation on the first abnormal parameter and the second abnormal parameter according to a preset weighting factor to obtain a comprehensive abnormal parameter of the vehicle; and
controlling the vehicle remotely according to the comprehensive abnormal parameter of the vehicle.

Optionally, controlling the vehicle remotely according to the comprehensive abnormal parameter of the vehicle includes:
controlling the vehicle remotely if the comprehensive abnormal parameter is greater than or equal to a preset threshold.

Optionally, the operation state information of the vehicle includes one or more of the following information: a position of the vehicle, a direction of the vehicle, a speed of the vehicle, an acceleration of the vehicle, an angular speed of the vehicle, a temperature of the vehicle, a braking force of the vehicle and a turning angle of the vehicle.

Optionally, the controlling the vehicle remotely includes:
performing one or more of the following controls on the vehicle: braking, parking, decelerating and turning.

A second aspect of the present disclosure provides a method for remotely controlling a self-driving vehicle, including:
detecting operation state information of the vehicle;
collecting video data and/or audio data of a passenger in the vehicle by a collecting device in the vehicle;
transmitting the operation state information of the vehicle, and the video data and/or audio data of the passenger in the vehicle to a control device;
receiving a control instruction transmitted by the control device; and
controlling the vehicle according to the control instruction.

A third aspect of the present disclosure provides an apparatus for remotely controlling a self-driving vehicle, including:

a receiving module, configured to receive operation state information of the vehicle to be controlled transmitted by the vehicle, and video data and/or audio data of a passenger in the vehicle;

a first determining module, configured to determine a first abnormal parameter of the vehicle according to the operation state information of the vehicle;

a second determining module, configured to determine a second abnormal parameter of an emotion of the passenger in the vehicle according to the video data and/or audio data of the passenger in the vehicle; and a controlling module, configured to control the vehicle remotely according to the first abnormal parameter and the second abnormal parameter.

Optionally, the second determining module is specifically configured to:

acquire an expression abnormal parameter and an action abnormal parameter of the passenger in the vehicle according to the video data of the passenger in the vehicle; and determine the second abnormal parameter according to the expression abnormal parameter and the action abnormal parameter.

Optionally, the second determining module is specifically configured to:

acquire an expression of the passenger in the vehicle and a level of the expression according to the video data of the passenger in the vehicle, and determine the expression abnormal parameter according to the expression of the passenger in the vehicle and the level of the expression; and acquire a key frame in a preset time period from the video data of the passenger in the vehicle, and determine the action abnormal parameter according to a pixel difference value between adjacent key frames in the preset time period.

Optionally, the second determining module is specifically configured to:

determine the emotion of the passenger in the vehicle and a level of the emotion according to the audio data of the passenger in the vehicle; and determine the second abnormal parameter according to the emotion of the passenger in the vehicle and the level of the emotion.

Optionally, the controlling module is specifically configured to:

perform a weighting operation on the first abnormal parameter and the second abnormal parameter according to a preset weighting factor to obtain a comprehensive abnormal parameter of the vehicle; and control the vehicle remotely according to the comprehensive abnormal parameter of the vehicle.

Optionally, the controlling module is specifically configured to:

control the vehicle remotely if the comprehensive abnormal parameter is greater than or equal to a preset threshold.

Optionally, the operation state information of the vehicle includes one or more of the following information: a position of the vehicle, a direction of the vehicle, a speed of the vehicle, an acceleration of the vehicle, an angular speed of the vehicle, a temperature of the vehicle, a braking force of the vehicle and a turning angle of the vehicle.

Optionally, the controlling module is specifically configured to:

perform one or more of the following controls on the vehicle: braking, parking, decelerating and turning.

A fourth aspect of the present disclosure provides an apparatus for remotely controlling a self-driving vehicle, including:

a detecting module, configured to detect operation state information of the vehicle;

a collecting module, configured to collect video data and/or audio data of a passenger in the vehicle by a collecting device in the vehicle;

a transmitting module, configured to transmit the operation state information of the vehicle, and the video data and/or audio data of the passenger in the vehicle to a control device;

a receiving module, configured to receive a control instruction transmitted by the control device; and a controlling module, configured to control the vehicle according to the control instruction.

A fifth aspect of the present disclosure provides a control device including a processor, a memory and a transceiver, where the memory is configured to store instructions, the transceiver is configured to communicate with other devices, and the processor is configured to execute the instructions stored in the memory to cause the control device to implement the method as described in the first aspect of the present disclosure and the alternatives.

A sixth aspect of the present disclosure provides an in-vehicle device including a processor, a memory and a transceiver, where the memory is configured to store instructions, the transceiver is configured to communicate with other devices, and the processor is configured to execute the instructions stored in the memory to cause the in-vehicle device to implement the method as described in the second aspect of the present disclosure.

A seventh aspect of the present disclosure provides a computer readable storage medium, where the computer readable storage medium stores instructions that, when executed, cause the computer to implement the method as described in the first aspect of the present disclosure and the alternatives.

An eighth aspect of the present disclosure provides a computer readable storage medium, where the computer readable storage medium stores instructions that, when executed, cause the computer to implement the method as described in the second aspect of the present disclosure.

The present disclosure provides a method and an apparatus for remotely controlling a self-driving vehicle, including: a control device receives operation state information of the vehicle to be controlled transmitted by the vehicle, and video data and/or audio data of a passenger in the vehicle; determines a first abnormal parameter of the vehicle according to the operation state information of the vehicle; determines a second abnormal parameter of an emotion of the passenger in the vehicle according to the video data and/or audio data of the passenger in the vehicle; and controls the vehicle remotely according to the first abnormal parameter and the second abnormal parameter. By acquiring the second abnormal parameter of the emotion of the passenger in the vehicle, remotely controlling the vehicle according to the abnormal parameter of the emotion and the abnormal parameter of the vehicle, it is possible to avoid the situation that the passenger in the vehicle performs a wrong manipulation on the vehicle due to a large emotional fluctuation in an emergency, thus making the control of the vehicle more safe and reliable in the emergency.

BRIEF DESCRIPTION OF DRAWINGS

The accompanying drawings, which are incorporated in the specification and constitute a part of the specification, illustrate embodiments according to the present disclosure, and are used to illustrate principles of the present disclosure with the specification.

The embodiments of the present disclosure have been shown in the foregoing drawings and are described in detail herein. The drawings and the written description are not intended to limit the scope of the present disclosure in any way, but to illustrate concepts of the present disclosure to those of ordinary skill in the art with reference to specific embodiments.

DESCRIPTION OF EMBODIMENTS

To make the goals, technical solutions, and advantages of the embodiments of the present disclosure clearer, the technical solutions in the embodiments of the present disclosure will be clearly and thoroughly described in conjunction with the drawings in the embodiments of the present disclosure. It is apparent that the embodiments described herein are merely a part of, rather than all of, the embodiments of the present disclosure. All other embodiments obtained by those of ordinary skill in the art based on the embodiments of the present disclosure without paying creative efforts shall fall within the scope of the present disclosure.

Remotely controlled vehicles, especially self-driving vehicles, are a basic requirement for the safety and efficiency of intelligent transportation systems. In order to achieve remote control of a vehicle, a control device needs to perform control interaction and information synchronization with the vehicle, and the vehicle also needs to coordinate controls of a driver and the control device.

Figure 1:
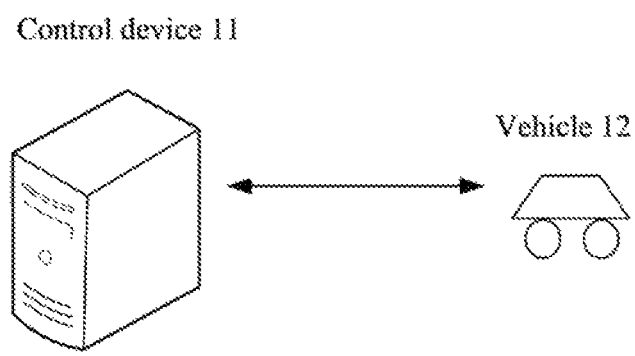
FIG. 1 is a schematic diagram of an intelligent transportation system to which the present disclosure is applied.

FIG. 1 is a schematic diagram of an intelligent transportation system to which the present disclosure is applied. As shown in FIG. 1, the intelligent transportation system includes a control device 11 and a vehicle 12. The vehicle 12 is a self-driving vehicle, and the control device 11 and the vehicle 12 communicate wirelessly. The control device is also referred to as a traffic control device. FIG. 1 is merely a schematic diagram, and more control devices and vehicles may be included in the intelligent transportation system, which is not limited by the present disclosure.

Information of the control device 11 is known in the intelligent transportation system and can be pre-configured or instantly acquired by the vehicle 12. The vehicle 12 transmits a registration request message to the control device 11 to request an establishment of a control association between the vehicle 12 and the control device 11 prior to participating in traffic activities. The registration request message contains a unique permanent identification that does not change for the vehicle 11 during its lifetime of use.

The control device 11 queries state information of the safety and environmental protection inspection, payments of insurance taxes, burglary reports, and the like according to the permanent identification of the vehicle 12. If a state of the vehicle 11 meets a criteria for participating in traffic activities, the control device 11 decides to allow the vehicle 12 to register with the intelligent transportation system, assigns the vehicle 12 with a temporary identification that can be used to identify the vehicle 12 in the intelligent transportation system, stores the permanent identification and the temporary identification of the vehicle 12 in association; otherwise the control device 11 decides to reject the registration of the vehicle 12 to the intelligent transportation system.

The control device 11 transmits a registration response message to the vehicle 12, to feed back an acceptance or a rejection of the establishment of the control association between the vehicle 12 and the control device 11. If it is an acceptance, a success flag and a temporary identification assigned to the vehicle 12 are included in the registration response message; if it is a rejection, a failure flag is included in the registration response message.

During the vehicle 12 participating in a traffic activity, the vehicle 12 transmits to the control device 11 a message related to a traffic application/service based on the control association, where the message includes a request-response or one-way notification.

During the vehicle 12 participating in a traffic activity, the control device 11 acquires vehicle information required for the control according to a preset cycle or in a temporarily triggered manner, where the vehicle information includes a vehicle user (user identification, etc.) and a driving mode (automatic driving/semi-automatic driving/manual driving, etc.), a using mode (self-use/rental, dedicated/shared, etc.), a road rights level (an emergency vehicle/a public vehicle/a general vehicle, etc.), an operation state (a position, a direction, a speed, an acceleration, an angular speed, etc.), a manipulation state (light settings, driver manipulation, etc.), a component state (a control component, a sensing component, a display component, etc.), external perception (other traffic participant information, traffic environment information, etc.). These kinds of information are respectively indicated by vehicle parameter identifications, which are actively notified by the vehicle 12 to the control device 11, or responded and fed back by the vehicle 12 to the control device 11 after the control device 11 requests the vehicle 12, and are stored in association with the temporary identification of the vehicle 12.

Figure 2:
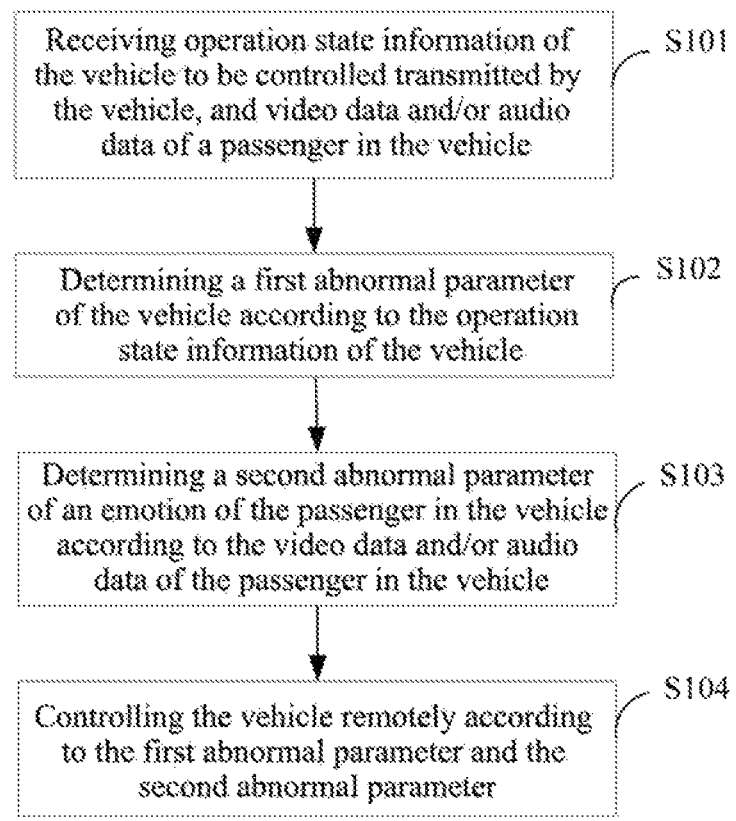
FIG. 2 is a flowchart of a method for remotely controlling a self-driving vehicle according to Embodiment 1 of the present disclosure.

Based on the intelligent transportation system shown in FIG. 1, Embodiment 1 of the present disclosure provides a method for remotely controlling a self-driving vehicle, and FIG. 2 is a flowchart of a method for remotely controlling a self-driving vehicle according to Embodiment 1 of the present disclosure. The method is executed by a control device. As shown in FIG. 2, the method provided in the embodiment includes the following steps:

Step S101: receiving operation state information of the vehicle to be controlled transmitted by the vehicle, and video data and/or audio data of a passenger in the vehicle.

The operation state information of the vehicle is monitored by a driving computer or an on board unit (OBU) in the vehicle. The operation state information of the vehicle includes one or more of the following information: a position of the vehicle, a direction of the vehicle, a speed of the vehicle, an acceleration of the vehicle, an angular speed of the vehicle, a temperature of the vehicle, a braking force of the vehicle and a turning angle of the vehicle.

The video data and/or audio data of the passenger in the vehicle are collected by a collecting device installed in the vehicle. The collecting device includes a camera for collecting video data, and further includes a device with a recording function for collecting audio data. The collecting device can be a dedicated device or a smartphone.

The collecting device is connected to the driving computer or the OBU, and transmits the collected video data and/or audio data of the passenger in the vehicle to the driving computer or the OBU. The operation state information of the vehicle and the video data and/or audio data of the passenger in the vehicle are transmitted together by the driving computer or the OBU to the control device.

The vehicle may actively transmit the operation state information of the vehicle and the video data and/or audio data of the passenger in the vehicle to the control device, either periodically or in real time. The vehicle may also transmit the operation state information of the vehicle and the video data and/or audio data of the passenger in the vehicle to the control device upon receiving a data request message transmitted by the control device.

Step S102: determining a first abnormal parameter of the vehicle according to the operation state information of the vehicle.

By way of example, a value of the first abnormal parameter is 0 or 1. When the control device determines that the vehicle is abnormal according to the operation state information of the vehicle, the value of the first abnormal parameter of the vehicle is 1. When the control device determines that the vehicle is normal according to the operation state information of the vehicle, the value of the first abnormal parameter of the vehicle is 0.

For example, the control device determines whether the vehicle is overspeed according to the speed of the vehicle, and determines the value of the first abnormal parameter to be 1 if the vehicle is overspeed, or determines the value of the first abnormal parameter to be 0 if the vehicle is not overspeed. Alternatively, the control device determines whether the vehicle is in a reverse run according to the direction of the vehicle, and determines the value of the first abnormal parameter to be 1 if the vehicle is in a reverse run, or determines the value of the first abnormal parameter to be 0 if the vehicle is not in a reverse run. Here is merely an example. In the embodiment, a plurality of parameters may be combined to determine whether an abnormality occurs in the vehicle.

By way of example, the value of the first abnormal parameter may also be any value between 0-1. When the value of the first abnormal parameter is 0, it indicates that no abnormality occurs in the vehicle. When the value of the first abnormal parameter is 1, it indicates that an abnormality has occurred in the vehicle. When the value of the first abnormal parameter is greater than 0 but smaller than 1, a greater value of the first abnormal parameter indicates a greater possibility of abnormality occurring in the vehicle.

The embodiment is merely an example. The first abnormal parameter may also be of other values, which is not limited in the embodiment.

Step S103: determining a second abnormal parameter of an emotion of the passenger in the vehicle according to the video data and/or audio data of the passenger in the vehicle.

By way of example, the second abnormal parameter of an emotion of the passenger in the vehicle can be determined in the following two manners:

Manner 1: acquiring an expression abnormal parameter and an action abnormal parameter of the passenger in the vehicle according to the video data of the passenger in the vehicle; and determining the second abnormal parameter according to the expression abnormal parameter and the action abnormal parameter.

An emotion of a person can be expressed through a facial expression. The expression of the passenger in the vehicle can be recognized via the face recognition technology, and the emotion of the passenger in the vehicle is determined according to the expression of the passenger in the vehicle. The emotion of the passenger includes happiness, anger, sadness and the like.

By way of example, the expression of the passenger in the vehicle and a level of the expression are acquired according to the video data of the passenger in the vehicle, and the expression abnormal parameter is determined according to the expression of the passenger in the vehicle and the level of the expression.

Different levels can be defined for different expressions. For example, for happiness, there are two levels. A level 1 indicates a little happy, and a level 2 indicates very happy. For example, when it is detected through a video detection that the passenger's face has an expression of smile, the level is 1, and it is detected through a video detection that the passenger's face has an expression of big laugh, the level is 2.

There are three levels of anger, the levels from low to high indicate the degrees of anger from low to high, where a level 1 indicates a little angry, a level 3 indicates very angry, and the degree of anger of a level 2 is between the level 1 and the level 3.

The value of the expression abnormal parameter may be 0 or 1. For example, when the expression of the passenger in the vehicle is happy, the expression abnormal parameter is 0, and when the expression of the passenger in the vehicle is angry or sad, the expression abnormal parameter is 1.

The value of the expression abnormal parameter may be any value between 0-1, for example, when the expression of the passenger in the vehicle is happy, the expression abnormal parameter is 0. In the case that the expression of the passenger in the vehicle is sad, when the level of sadness is 1, the expression abnormal parameter is 0.1, and when the level of sadness is 2, the expression abnormal parameter is 0.5. In the case that the expression of the passenger in the vehicle is angry, when the level of anger is 1, the expression abnormal parameter is 0.3, when the level of anger is 2, the expression abnormal parameter is 0.6, and when the level of anger is 3, the expression abnormal parameter is 1.

Obviously, the value of the expression abnormal parameter may also be other values, which is not limited in the embodiment.

Human emotions can be expressed not only through facial expressions, but also through actions (or gestures). Therefore, in the embodiment, an action abnormal parameter is also acquired. The expression abnormal parameter and action abnormal parameter are combined to determine whether the emotion of the passenger is abnormal and to determine the corresponding second abnormal parameter.

By way of example, a key frame in a preset time period is acquired from the video data of the passenger in the vehicle, and the action abnormal parameter is determined according to a pixel difference value between adjacent key frames in the preset time period.

A key frame is equivalent to an original image in a two-dimensional animation, which refers to a frame in which a key motion of a character or an object moves or changes. Animation between key frames can be created by software, which is called a transition frame or an intermediate frame.

In the embodiment, the key frame in the preset time period is acquired from the video data, and the key frame can reflect a main action of the passenger. If a movement of the passenger changes greatly, a pixel difference between adjacent key frames will be relatively large. If the movement of the passenger remains almost unchanged, the pixel difference between adjacent key frames will be very small. Therefore, in the embodiment, it is required to calculate a pixel difference value of adjacent key frames within a preset time period, and determine an action abnormal parameter according to the pixel difference value between the adjacent key frames.

After calculating and obtaining the pixel difference value between the adjacent key frames in the preset time period, the number of groups of adjacent key frames in the preset time period whose pixel difference values are greater than a preset value is counted, if the number of groups of adjacent key frames in the preset time period whose pixel difference values are greater than a preset value exceeds (greater than or equal to) N, it is determined that the action of the passenger is abnormal. If the number of groups of adjacent key frames in the preset time period whose pixel difference values are greater than a preset value is smaller than N, it is determined that the action of the passenger is not abnormal, where the action abnormal parameter is obtained according to whether the action of the passenger is abnormal, and the value of N is set in advance.

The value of the action abnormal parameter may be 0 or 1. For example, if the action of the passenger is abnormal, the action abnormal parameter has a value of 1, and if the action of the passenger is not abnormal, the action abnormal parameter has a value of 0. The value of the action abnormal parameter may also be any value between 0-1. The embodiment is merely an example and is not limited thereto.

Assume that there are 10 frames in the preset time period, and the key frames are Frame 1, Frame 3, Frame 5, Frame 7 and Frame 9. There are four groups of adjacent key frames in the preset time period: Frame 1 and Frame 3, Frame 3 and Frame 5, Frame 5 and Frame 7, Frame 7 and Frame 9. The pixel difference values of the four groups of adjacent key frames are respectively calculated to determine the number of adjacent key frames in the preset time period whose pixel difference values are greater than the preset value. Assume that there are two groups of adjacent key frames, where the pixel difference values of each group of adjacent key frames are greater than the preset value, and the value of N is 3, it is thus determined that the action of the passenger is not abnormal.

After calculating and obtaining the expression abnormal parameter and the action abnormal parameter, a weighting operation may be performed on the expression abnormal parameter and the action abnormal parameter to obtain the second abnormal parameter of the emotion of the passenger in the vehicle.

The second abnormal parameter of the emotion of the passenger in the vehicle obtained by combining the expression abnormal parameter and the action abnormal parameter in the embodiment is more accurate.

It should be noted that, in an alternative embodiment of the present disclosure, the second abnormal parameter of the emotion of the passenger in the vehicle may be determined simply according to the expression abnormal parameter or the action abnormal parameter.

In addition, in an alternative embodiment of the disclosure, the level of the expression may not be defined, and the expression abnormal parameter may be directly determined according to the expression.

Manner 2: the emotion of the passenger in the vehicle and a level of the emotion are determined according to the audio data of the passenger in the vehicle; and the second abnormal parameter is determined according to the emotion of the passenger in the vehicle and the level of the emotion.

The emotion of the person can also be expressed by an intonation. Therefore, in the embodiment, the intonation of the passenger can be detected, and the emotion of the passenger in the vehicle and the level of the emotion are determined according to the intonation, where the level of the emotion is similar to the aforementioned level of the expression, which is not repeated herein.

Optionally, a voice of the passenger can also be recognized by the voice recognition technology, and the emotion of the passenger in the vehicle and the level of the emotion are determined according to the voice of the passenger.

It can be understood that in other alternative embodiments of the present disclosure, the second abnormal parameter may also be determined in combination with the video data and the voice data.

Step S104: controlling the vehicle remotely according to the first abnormal parameter and the second abnormal parameter.

In the embodiment, one or more of the following controls may be performed on the vehicle: braking, parking, deceleration, turning.

In the embodiment, the vehicle can be remotely controlled by adopting the following methods:

In an exemplary manner, a weighting operation may be performed on the first abnormal parameter and the second abnormal parameter according to a preset weighting factor to obtain a comprehensive abnormal parameter of the vehicle; and the vehicle is controlled remotely according to the comprehensive abnormal parameter of the vehicle.

For example, a weighting factor of the first abnormal parameter is 0.3, a weighting factor of the second abnormal parameter is 0.7, a value of the first abnormal parameter is 0, and a value of the second abnormal parameter is 1, and then the comprehensive abnormal parameter is 0.7. When the value of the first abnormal parameter is 1, and the value of the second abnormal parameter is 0, the obtained comprehensive abnormal parameter is 0.3.

After the comprehensive abnormal parameter is obtained, the comprehensive abnormal parameter can be compared with a preset threshold. If the comprehensive abnormal parameter is greater than the preset threshold, remote control is performed on the vehicle. If the comprehensive abnormal parameter is smaller than the preset threshold, no remote control is performed on the vehicle.

Optionally, an interval of the comprehensive abnormal parameter corresponding to the remote control may also be defined. For example, when the comprehensive abnormal parameter is in an interval of 0.7-1 (including 0.7 and 1), the vehicle is remotely controlled. And after obtaining the comprehensive abnormal parameter, the control device determines whether the comprehensive abnormal parameter falls within the interval of the comprehensive abnormal parameter, and if it falls within the interval, it is determined to control the vehicle remotely, and if it does not fall within the interval, it is determined to not control the vehicle remotely.

Optionally, a corresponding relationship between the comprehensive abnormal parameter and the remote control may also be predefined, where the corresponding relationship is as shown in Table 1:

TABLE I

| Comprehensive abnormal parameter | Whether to control remotely |
|---|---|
| 0.1 | No |
| 0.2 | No |
| ... | ... |
| 0.8 | Yes |
| 0.9 | Yes |
| 1.0 | Yes |

In another exemplary manner, a corresponding relationship between the first abnormal parameter and the second abnormal parameter and the remote control is predefined, and the corresponding relationship may be stored in a form of a list, and subsequently, whether to remotely control the vehicle is determined according to the first abnormal parameter, the second abnormal parameter and the corresponding relationship.

After the remote control of the vehicle is determined by the control device, the control device transmits a remote control instruction to the vehicle, where the remote control instruction includes identification information of the vehicle.

In the embodiment, a control device receives operation state information of the vehicle to be controlled transmitted by the vehicle, and video data and/or audio data of a passenger in the vehicle; determines a first abnormal parameter of the vehicle according to the operation state information of the vehicle; determines a second abnormal parameter of an emotion of the passenger in the vehicle according to the video data and/or audio data of the passenger in the vehicle; and controls the vehicle remotely according to the first abnormal parameter and the second abnormal parameter. By acquiring the second abnormal parameter of the emotion of the passenger in the vehicle, remotely controlling the vehicle according to the abnormal parameter of the emotion and the abnormal parameter of the vehicle, it is possible to avoid the situation that the passenger in the vehicle performs a wrong manipulation on the vehicle due to a large emotional fluctuation in an emergency, thus making the control of the vehicle more safe and reliable in the emergency.

Figure 3:
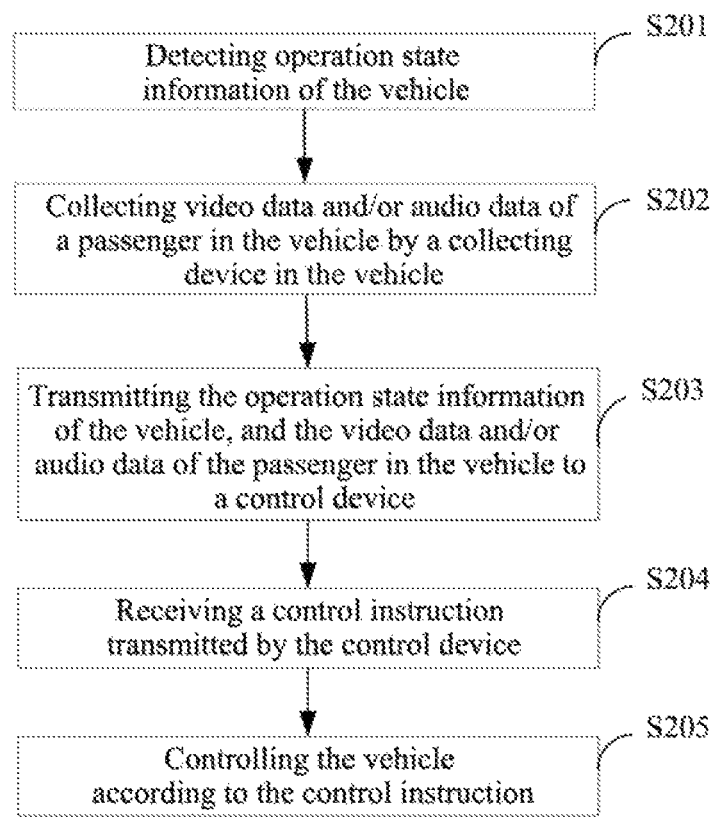
FIG. 3 is a flowchart of a method for remotely controlling a self-driving vehicle according to Embodiment 2 of the present disclosure.

FIG. 3 is a flowchart of a method for remotely controlling a self-driving vehicle according to Embodiment 2 of the present disclosure. The embodiment describes the method from the perspective of a vehicle. As shown in FIG. 3, the method provided in the embodiment includes the following steps:

Step S201: detecting operation state information of the vehicle.

The operation state information of the vehicle may be monitored and obtained by a driving computer or an OBU in the vehicle, where the operation state information of the vehicle includes one or more of the following information: a position of the vehicle, a direction of the vehicle, a speed of the vehicle, an acceleration of the vehicle, an angular speed of the vehicle, a temperature of the vehicle, a braking force of the vehicle and a turning angle of the vehicle.

Step S202: collecting video data and/or audio data of a passenger in the vehicle by a collecting device in the vehicle.

The collecting device includes a camera for collecting video data, and further includes a device with a recording function for collecting audio data. The collecting device can be a dedicated device or a smartphone.

Step S203: transmitting the operation state information of the vehicle, and the video data and/or audio data of the passenger in the vehicle to a control device.

The collecting device is connected to the driving computer or the OBU, and transmits the collected video data and/or audio data of the passenger in the vehicle to the driving computer or the OBU. The operation state information of the vehicle and the video data and/or audio data of the passenger in the vehicle are transmitted together by the driving computer or the OBU to the control device.

The vehicle may actively transmit the operation state information of the vehicle and the video data and/or audio data of the passenger in the vehicle to the control device, either periodically or in real time. The vehicle may also transmit the operation state information of the vehicle and the video data and/or audio data of the passenger in the vehicle to the control device upon receiving a data request message transmitted by the control device.

Step S204: receiving a control instruction transmitted by the control device.

After the remote control of the vehicle is determined by the control device, the control device transmits a remote control instruction to the vehicle, where the remote control instruction includes identification information of the vehicle.

Step S205: controlling the vehicle according to the control instruction.

In the embodiment, one or more of the following controls may be performed on the vehicle: braking, parking, deceleration, turning.

In the embodiment, operation state information of the vehicle is detected, video data and/or audio data of a passenger in the vehicle are collected by a collecting device in the vehicle; the operation state information of the vehicle, and the video data and/or audio data of the passenger in the vehicle are transmitted to a control device; a control instruction transmitted by the control device is received; and the vehicle is controlled according to the control instruction. By transmitting the video data and/or audio data of the passenger in the vehicle to the control device, enabling the control device to obtain an abnormal parameter of an emotion of the passenger in the vehicle according to the video data and/or audio data of the passenger in the vehicle, and remotely control the vehicle according to the abnormal parameter of the emotion of the passenger in the vehicle and the abnormal parameter of the vehicle, thus avoiding the situation that the passenger in the vehicle performs a wrong manipulation on the vehicle due to a large emotional fluctuation in an emergency.

Figure 4:
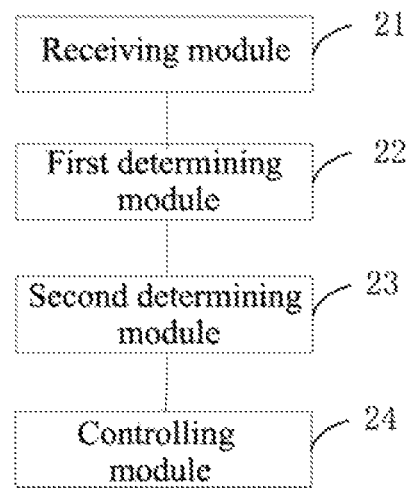
FIG. 4 is a schematic structural diagram of an apparatus for remotely controlling a self-driving vehicle according to Embodiment 3 of the present disclosure.

FIG. 4 is a schematic structural diagram of an apparatus for remotely controlling a self-driving vehicle according to Embodiment 3 of the present disclosure. The device can be integrated into a control device. As shown in FIG. 4, the device provided in the embodiment includes:

a receiving module 21, configured to receive operation state information of the vehicle to be controlled transmitted by the vehicle, and video data and/or audio data of a passenger in the vehicle;

a first determining module 22, configured to determine a first abnormal parameter of the vehicle according to the operation state information of the vehicle;

a second determining module 23, configured to determine a second abnormal parameter of an emotion of the passenger in the vehicle according to the video data and/or audio data of the passenger in the vehicle; and a controlling module 24, configured to control the vehicle remotely according to the first abnormal parameter and the second abnormal parameter.

Optionally, the second determining module 23 is specifically configured to:

acquire an expression abnormal parameter and an action abnormal parameter of the passenger in the vehicle according to the video data of the passenger in the vehicle; and determine the second abnormal parameter according to the expression abnormal parameter and the action abnormal parameter.

Optionally, the second determining module 23 is specifically configured to:

acquire an expression of the passenger in the vehicle and a level of the expression according to the video data of the passenger in the vehicle, and determine the expression abnormal parameter according to the expression of the passenger in the vehicle and the level of the expression; and acquire a key frame in a preset time period from the video data of the passenger in the vehicle, and determine the action abnormal parameter according to a pixel difference value between adjacent key frames in the preset time period.

Optionally, the second determining module 23 is specifically configured to:

determine the emotion of the passenger in the vehicle and a level of the emotion according to the audio data of the passenger in the vehicle; and determine the second abnormal parameter according to the emotion of the passenger in the vehicle and the level of the emotion.

Optionally, the controlling module 24 is specifically configured to:

perform a weighting operation on the first abnormal parameter and the second abnormal parameter according to a preset weighting factor to obtain a comprehensive abnormal parameter of the vehicle; and control the vehicle remotely according to the comprehensive abnormal parameter of the vehicle.

Optionally, the controlling module 24 is specifically configured to:

control the vehicle remotely if the comprehensive abnormal parameter is greater than or equal to a preset threshold.

Optionally, the operation state information of the vehicle includes one or more of the following information: a position of the vehicle, a direction of the vehicle, a speed of the vehicle, an acceleration of the vehicle, an angular speed of the vehicle, a temperature of the vehicle, a braking force of the vehicle and a turning angle of the vehicle.

Optionally, the controlling module 24 is specifically configured to:

perform one or more of the following controls on the vehicle: braking, parking, decelerating and turning.

The device provided in the embodiment can be used to perform the method described in Embodiment 1. The specific implementations and technical effects are similar, and details are not described herein again.

Figure 5:
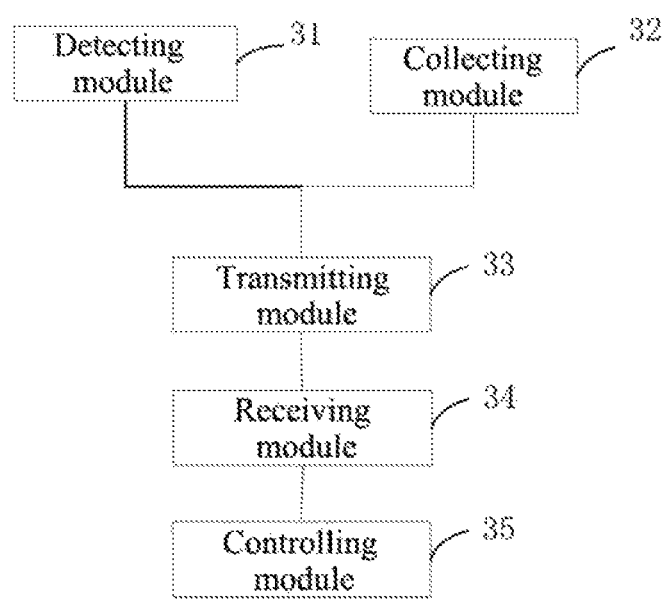
FIG. 5 is a schematic structural diagram of an apparatus for remotely controlling a self-driving vehicle according to Embodiment 4 of the present disclosure.

FIG. 5 is a schematic structural diagram of an apparatus for remotely controlling a self-driving vehicle according to Embodiment 4 of the present disclosure. The device of the embodiment can be integrated into an in-vehicle device, where the in-vehicle device is installed in a self-driving vehicle. As shown in FIG. 5, the device provided in the embodiment includes:

a detecting module 31, configured to detect operation state information of the vehicle;

a collecting module 32, configured to collect video data and/or audio data of a passenger in the vehicle by a collecting device in the vehicle;

a transmitting module 33, configured to transmit the operation state information of the vehicle, and the video data and/or audio data of the passenger in the vehicle to a control device;

a receiving module 34, configured to receive a control instruction transmitted by the control device; and a controlling module 35, configured to control the vehicle according to the control instruction.

The device provided in the embodiment can be used to perform the method described in Embodiment 2. The specific implementations and technical effects are similar, and details are not described herein again.

Figure 6:
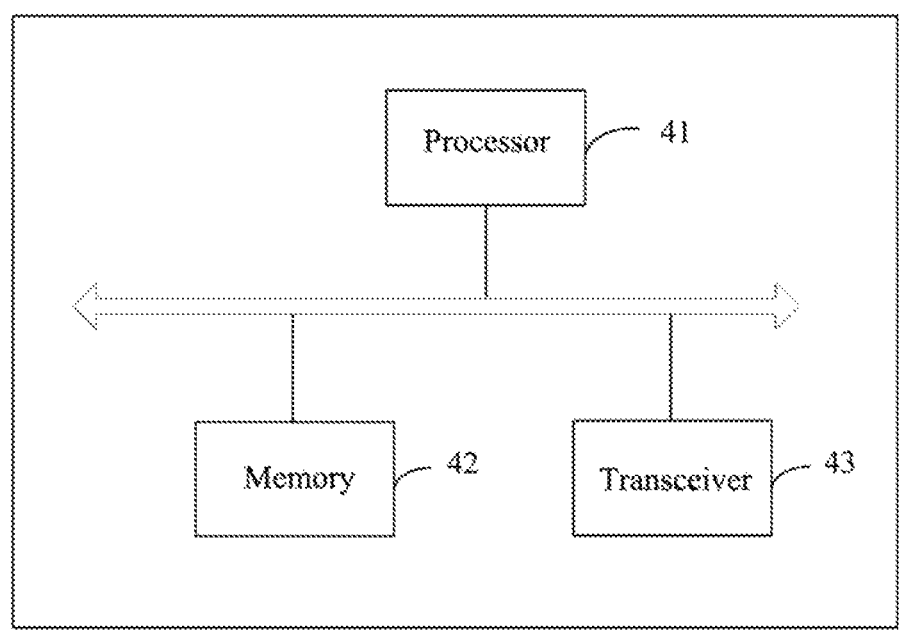
FIG. 6 is a schematic structural diagram of a control device according to Embodiment 5 of the present disclosure.

FIG. 6 is a schematic structural diagram of a control device according to Embodiment 5 of the present disclosure. As shown in FIG. 6, the control device provided in the embodiment includes a processor 41, a memory 42, a transceiver 43, where the memory 42 and the transceiver 43 are connected to and communicated with the processor 41 via a bus. The memory 42 is configured to store instructions. The transceiver 43 is configured to communicate with other devices. The processor 41 is configured to execute the instructions stored in the memory 42 to cause the control device to perform the method as described in Embodiment 1, where details are not described herein again.

Figure 7:
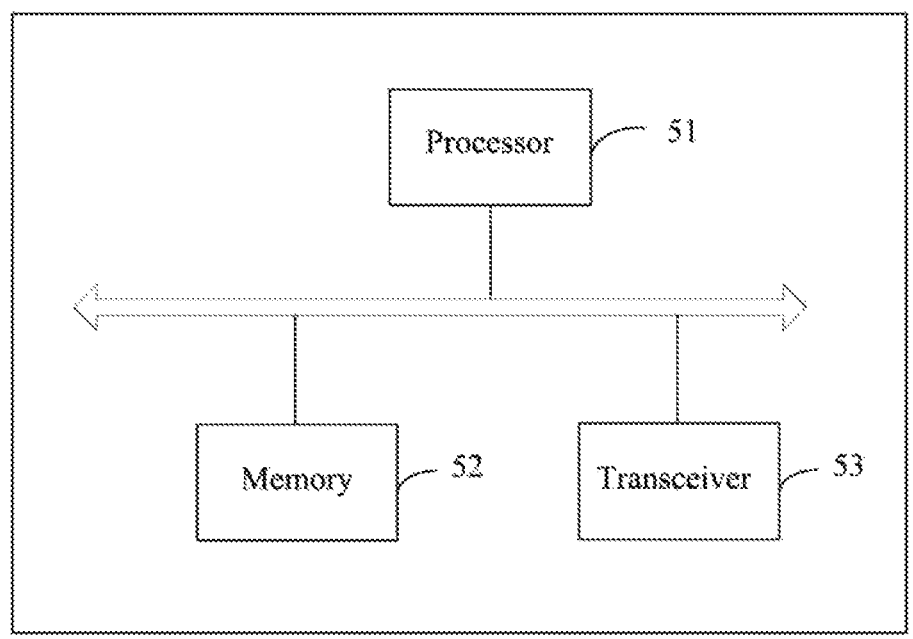
FIG. 7 is a schematic structural diagram of an in-vehicle device according to Embodiment 6 of the present disclosure.

FIG. 7 is a schematic structural diagram of an in-vehicle device according to Embodiment 6 of the present disclosure. As shown in FIG. 7, the in-vehicle device provided in the embodiment includes a processor 51, a memory 52, and a transceiver 53, where the memory 52 and the transceiver 53 are connected to and communicated with the processor 51 via a bus. The memory 52 is configured to store instructions. The transceiver 53 is configured to communicate with other devices. The processor 51 is configured to execute the instructions stored in the memory 52 to cause the in-vehicle device to perform the method as described in Embodiment 2, where details are not described herein again.

The processor may be a microcontroller unit (MCU), where the MCU is also called as a single chip microcomputer or a single chip microcomputer. The processor may also be a central process unit (CPU), a digital signal processor (DSP), an application specific integrated circuit (ASIC), a field programmable gate array (FPGA) or another programmable logic device, discrete gate or a transistor logic device.

The memory can be implemented by any type of volatile or non-volatile memory device or a combination thereof, such as a static random access memory (SRAM), an electrically erasable programmable read only memory (EEPROM), an erasable programmable read only memory (EPROM), a programmable read only Memory (PROM), a read only memory (ROM), a magnetic memory, a flash memory, a disk or a compact disk.

The transceiver can establish a wired or wireless communication link with other devices such that a smart device can access a wireless network based on a communication standard, such as WiFi, 2G or 3G, or a combination thereof. In an exemplary embodiment, the transceiver further includes a near field communication (NFC) module to facilitate short range communication. For example, the NFC module can be implemented based on radio frequency identification (RFID) technology, infrared data association (IrDA) technology, ultra-wideband (UWB) technology, bluetooth (BT) technology, and other technologies.

The bus may be an industry standard architecture (ISA) bus, a peripheral component (PCI) bus, or an extended industry standard architecture (EISA) bus. The bus can be divided into an address bus, a data bus, a control bus, and the like. For ease of representation, the bus in the drawings of the present disclosure is not limited to only one bus or one type of bus.

Embodiment 7 of the present disclosure provides a computer readable storage medium, where the computer readable storage medium stores instructions that, when executed, cause the computer to implement the method as described in Embodiment 1.

Embodiment 8 of the present disclosure provides a computer readable storage medium, where the computer readable storage medium stores instructions that, when executed, cause the computer to implement the method as described in Embodiment 2.

At last, it should be noted that the above embodiments are merely illustrative of the technical solutions of the present disclosure, and are not intended to be limiting. Although the present disclosure has been described in detail with reference to the foregoing embodiments, those skilled in the art will understand that the technical solutions described in the foregoing embodiments may be modified, or that some or all of the technical features may be equivalently substituted; these modifications or substitutions do not deviate the nature of the corresponding technical solution from the scope of the technical solutions of various embodiments according to the present disclosure.

What is claimed is:

1. A method for remotely controlling a self-driving vehicle, comprising:
   receiving operation state information of the vehicle to be controlled transmitted by the vehicle, and at least one of video data and audio data of a passenger in the vehicle;
   determining a first abnormal parameter of the vehicle according to the operation state information of the vehicle;
   determining a second abnormal parameter of an emotion of the passenger in the vehicle according to at least one of the video data and the audio data of the passenger in the vehicle; and
   controlling the vehicle remotely according to the first abnormal parameter and the second abnormal parameter;
   wherein the determining a second abnormal parameter of an emotion of the passenger in the vehicle according to at least one of the video data and the audio data of the passenger in the vehicle comprises:
   acquiring an expression abnormal parameter and an action abnormal parameter of the passenger in the vehicle according to the video data of the passenger in the vehicle; and
   determining the second abnormal parameter according to the expression abnormal parameter and the action abnormal parameter;
   wherein the acquiring an expression abnormal parameter and an action abnormal parameter of the passenger in the vehicle according to the video data of the passenger in the vehicle comprises:
   acquiring an expression of the passenger in the vehicle and a level of the expression according to the video data of the passenger in the vehicle, and determining the expression abnormal parameter according to the expression of the passenger in the vehicle and the level of the expression;
   acquiring a key frame in a preset time period from the video data of the passenger in the vehicle, and after calculating and obtaining a pixel difference value between adjacent key frames in the preset time period, a number of groups of adjacent key frames in the preset time period whose pixel difference values are greater than a preset value is counted, if the number of groups of adjacent key frames in the preset time period whose pixel difference values are greater than a preset value greater than or equal to N, it is determined that the action of the passenger is abnormal; otherwise it is determined that the action of the passenger is not abnormal, where the action abnormal parameter is obtained according to whether the action of the passenger is abnormal, and a value of N is set in advance.

2. The method according to claim 1, wherein the determining a second abnormal parameter of an emotion of the passenger in the vehicle according to at least one of the video data and the audio data of the passenger in the vehicle further comprises:
   determining the emotion of the passenger in the vehicle and a level of the emotion according to the audio data of the passenger in the vehicle; and
   determining the second abnormal parameter according to the emotion of the passenger in the vehicle and the level of the emotion.

3. The method according to claim 1, wherein the controlling the vehicle remotely according to the first abnormal parameter and the second abnormal parameter comprises:
   performing a weighting operation on the first abnormal parameter and the second abnormal parameter according to a preset weighting factor to obtain a comprehensive abnormal parameter of the vehicle; and
   controlling the vehicle remotely according to the comprehensive abnormal parameter of the vehicle.

4. The method according to claim 3, wherein controlling the vehicle remotely according to the comprehensive abnormal parameter of the vehicle comprises:
   controlling the vehicle remotely if the comprehensive abnormal parameter is greater than or equal to a preset threshold.

5. The method according to claim 1, wherein the operation state information of the vehicle comprises one or more of the following information: a position of the vehicle, a direction of the vehicle, a speed of the vehicle, an acceleration of the vehicle, an angular speed of the vehicle, a temperature of the vehicle, a braking force of the vehicle and a turning angle of the vehicle.

6. The method according to claim 1, wherein the controlling the vehicle remotely comprises:
   performing one or more of the following controls on the vehicle: braking, parking, decelerating and turning.

7. A method for remotely controlling a self-driving vehicle, comprising:
   detecting operation state information of the vehicle;
   collecting at least one of video data and audio data of a passenger in the vehicle by a collecting device in the vehicle;
   transmitting the operation state information of the vehicle, and at least one of the video data and the audio data of the passenger in the vehicle to a control device;
   receiving a control instruction transmitted by the control device; and
   controlling the vehicle according to the control instruction.

8. The method according to claim 1, wherein determining the second abnormal parameter according to the expression abnormal parameter and the action abnormal parameter comprises:
   determining the second abnormal parameter by performing a weighting operation on the expression abnormal parameter and the action abnormal parameter.

9. A control device, comprising a processor, a memory and a transceiver, wherein the memory is configured to store instructions, the transceiver is configured to communicate with other devices, and the processor is configured to execute the instructions stored in the memory to cause the control device to:
   receive operation state information of a vehicle to be controlled transmitted by the vehicle, and at least one of video data and audio data of a passenger in the vehicle;
   determine a first abnormal parameter of the vehicle according to the operation state information of the vehicle;
   determine a second abnormal parameter of an emotion of the passenger in the vehicle according to at least one of the video data and the audio data of the passenger in the vehicle; and
   control the vehicle remotely according to the first abnormal parameter and the second abnormal parameter;
   wherein the processor is further configured to execute the instructions stored in the memory to cause the control device to:
   acquire an expression of the passenger in the vehicle and a level of the expression according to the video data of the passenger in the vehicle, and determine the expression abnormal parameter according to the expression of the passenger in the vehicle and the level of the expression;
   acquire a key frame in a preset time period from the video data of the passenger in the vehicle, and calculate and obtain a pixel difference value between adjacent key frames in the preset time period, and then a number of groups of adjacent key frames in the preset time period whose pixel difference values are greater than a preset value is counted, if the number of groups of adjacent key frames in the preset time period whose pixel difference values are greater than a preset value greater than or equal to N, it is determined that the action of the passenger is abnormal; otherwise it is determined that the action of the passenger is not abnormal, where the action abnormal parameter is obtained according to whether the action of the passenger is abnormal, and a value of N is set in advance; and
   determine the second abnormal parameter according to the expression abnormal parameter and the action abnormal parameter.

10. The control device according to claim 9, wherein the processor is further configured to execute the instructions stored in the memory to cause the control device to:
    determine the emotion of the passenger in the vehicle and a level of the emotion according to the audio data of the passenger in the vehicle; and
    determine the second abnormal parameter according to the emotion of the passenger in the vehicle and the level of the emotion.

11. The control device according to claim 9, wherein the processor is further configured to execute the instructions stored in the memory to cause the control device to:
    perform a weighting operation on the first abnormal parameter and the second abnormal parameter according to a preset weighting factor to obtain a comprehensive abnormal parameter of the vehicle; and
    control the vehicle remotely according to the comprehensive abnormal parameter of the vehicle.

12. The control device according to claim 11, wherein the processor is further configured to execute the instructions stored in the memory to cause the control device to:
    control the vehicle remotely if the comprehensive abnormal parameter is greater than or equal to a preset threshold.

13. The control device according to claim 9, wherein the operation state information of the vehicle comprises one or more of the following information: a position of the vehicle, a direction of the vehicle, a speed of the vehicle, an acceleration of the vehicle, an angular speed of the vehicle, a temperature of the vehicle, a braking force of the vehicle and a turning angle of the vehicle.

14. The control device according to claim 9, wherein the processor is further configured to execute the instructions stored in the memory to cause the control device to:
    perform one or more of the following controls on the vehicle: braking, parking, decelerating and turning.

15. An in-vehicle device, comprising a processor, a memory and a transceiver, wherein the memory is configured to store instructions, the transceiver is configured to communicate with other devices, and the processor is configured to execute the instructions stored in the memory to cause the in-vehicle device to implement the method according to claim 7.

16. A non-transitory computer readable storage medium, wherein the computer readable storage medium stores instructions that, when executed, cause a computer to implement the method according to claim 1.

17. A non-transitory computer readable storage medium, wherein the computer readable storage medium stores instructions that, when executed, cause a computer to implement the method according to claim 7.

* * * * *